United States Patent
Iwashimizu et al.

(10) Patent No.: US 11,802,990 B2
(45) Date of Patent: Oct. 31, 2023

(54) OPTICAL SYSTEM AND OPTICAL COMPENSATION METHOD

(71) Applicants: MITSUBISHI HEAVY INDUSTRIES, LTD., Tokyo (JP); RIKEN, Wako (JP); Institute for Laser Technology, Osaka (JP)

(72) Inventors: Masashi Iwashimizu, Tokyo (JP); Hiroyuki Daigo, Tokyo (JP); Shingo Nishikata, Tokyo (JP); Kazunori Masukawa, Tokyo (JP); Atsushi Ochiai, Tokyo (JP); Toshikazu Ebisuzaki, Saitama (JP); Satoshi Wada, Saitama (JP); Yoshiyuki Takizawa, Saitama (JP); Masayuki Maruyama, Saitama (JP); Shinji Motokoshi, Osaka (JP)

(73) Assignees: MITSUBISHI HEAVY INDUSTRIES, LTD., Tokyo (JP); RIKEN, Saitama (JP); INSTITUTE FOR LASER TECHNOLOGY, Osaka (JP)

( * ) Notice: Subject to any disclaimer, the term of this patent is extended or adjusted under 35 U.S.C. 154(b) by 340 days.

(21) Appl. No.: 17/269,153

(22) PCT Filed: Aug. 23, 2019

(86) PCT No.: PCT/JP2019/033044
§ 371 (c)(1),
(2) Date: Feb. 17, 2021

(87) PCT Pub. No.: WO2020/100371
PCT Pub. Date: May 22, 2020

(65) Prior Publication Data
US 2021/0311225 A1    Oct. 7, 2021

(30) Foreign Application Priority Data
Nov. 13, 2018 (JP) ................ 2018-212842

(51) Int. Cl.
*G01W 1/10* (2006.01)
*G01N 15/06* (2006.01)
*G02B 27/00* (2006.01)

(52) U.S. Cl.
CPC .............. *G01W 1/10* (2013.01); *G01N 15/06* (2013.01); *G02B 27/0068* (2013.01); *G01N 2015/0693* (2013.01)

(58) Field of Classification Search
CPC ..... G01W 1/10; G01N 15/06; G01N 15/0693; G02B 27/0068
See application file for complete search history.

(56) References Cited

U.S. PATENT DOCUMENTS 3,746,080 A * 7/1973 Mallory ................. A01G 7/045
47/17
4,426,640 A * 1/1984 Becconsall ............. G01S 17/95
250/338.5
(Continued)

FOREIGN PATENT DOCUMENTS

EP    3 179 267    6/2017
JP    05-136509    6/1993
(Continued)

OTHER PUBLICATIONS

Notification of Transmittal of Translation of the International Preliminary Report on Patentability dated May 27, 2021 in International (PCT) Application No. PCT/JP2019/033044.
(Continued)

*Primary Examiner* — Dominic J Bologna
*Assistant Examiner* — Jarreas C Underwood
(74) *Attorney, Agent, or Firm* — Wenderoth, Lind & Ponack, L.L.P.

(57) ABSTRACT

An optical system that obtains characteristics of a transmission path in atmosphere, when laser light propagates through
(Continued)

this transmission path, at a place separated from this transmission path and before the propagation, and corrects wavefront of the laser light based on the obtained characteristics, is provided. The optical system is provided with an irradiation device and an atmospheric characteristics obtaining system. The irradiation device irradiates an external target with light via a first optical path. The atmospheric characteristics obtaining system is arranged in a second optical path separated from the first optical path and obtains characteristics of atmospheric environment in the first optical path with respect to the irradiated light. The irradiation device is provided with wavefront correction optics. The wavefront correction optics correct wavefront of the irradiated light based on the obtained characteristics.

14 Claims, 7 Drawing Sheets

(56) References Cited

U.S. PATENT DOCUMENTS

| | | | | |
|---|---|---|---|---|
| 4,888,484 | A * | 12/1989 | Harvey | G01N 21/3577 |
| | | | | 250/343 |
| 4,950,075 | A * | 8/1990 | Ichinose | G01N 21/538 |
| | | | | 356/342 |
| 5,298,751 | A * | 3/1994 | Fee | G01S 17/88 |
| | | | | 250/338.5 |
| 5,317,156 | A * | 5/1994 | Cooper | G01N 21/39 |
| | | | | 250/350 |
| 6,053,738 | A * | 4/2000 | Ivey, Jr. | A61L 9/125 |
| | | | | 273/460 |
| 7,088,457 | B1 * | 8/2006 | Zou | G01M 11/0257 |
| | | | | 356/124 |
| 9,502,854 | B1 | 11/2016 | Filgas | |
| 2002/0196506 | A1 * | 12/2002 | Graves | H04B 10/1125 |
| | | | | 398/126 |
| 2006/0008274 | A1 * | 1/2006 | Wilcken | H01Q 3/2676 |
| | | | | 398/115 |
| 2006/0274291 | A1 * | 12/2006 | Nagahashi | G03F 7/70933 |
| | | | | 355/53 |
| 2008/0036977 | A1 | 2/2008 | Sugita et al. | |
| 2009/0028198 | A1 * | 1/2009 | Belenkii | G02B 27/52 |
| | | | | 372/33 |
| 2009/0265108 | A1 * | 10/2009 | Chan | G01W 1/00 |
| | | | | 702/3 |
| 2011/0103410 | A1 * | 5/2011 | Hutchin | G02B 26/0825 |
| | | | | 372/9 |
| 2012/0018614 | A1 * | 1/2012 | King | G02B 26/0816 |
| | | | | 250/201.9 |
| 2014/0176710 | A1 * | 6/2014 | Brady | H04N 5/2624 |
| | | | | 348/144 |
| 2016/0258752 | A1 | 9/2016 | Hornung | |
| 2016/0336713 | A1 | 11/2016 | Nogiwa et al. | |
| 2017/0254999 | A1 * | 9/2017 | Brady | H04N 23/698 |
| 2020/0119811 | A1 * | 4/2020 | Kay | H04B 10/118 |
| 2022/0326363 | A1 * | 10/2022 | Hoffer, Jr. | G01S 7/4816 |

FOREIGN PATENT DOCUMENTS

| | | |
|---|---|---|
| JP | 2003-181661 | 7/2003 |
| JP | 2005-101223 | 4/2005 |
| JP | 2017-157737 | 9/2017 |
| JP | 2018-525845 | 9/2018 |
| WO | 2005/083508 | 9/2005 |
| WO | 2015/128943 | 9/2015 |

OTHER PUBLICATIONS

International Search Report dated Nov. 12, 2019 in International (PCT) Application No. PCT/JP2019/033044.
Jonathan F. Schonfeld, "The Theory of Compensated Laser Propagation through Strong Thermal Blooming," The Lincoln Laboratory Journal, vol. 5, No. 1, pp. 131-150, 1992.
B. Hafizi, "Determination of Absorption Coefficient Based on Laser Beam Thermal Blooming in Gas-Filled Tube," Applied Optics, vol. 53, Issue 22, pp. 5016-5023, 2014 with English abstract.
Extended European Search Report dated Sep. 10, 2021 in corresponding European Patent Application No. 19885307.9.
Kaymak Yagiz et al: "A Survey on Acquisition, Tracking, and Pointing Mechanisms for Mobile Free-Space Optical Communications", IEEE Communications Survey & Tutorials, vol. 20, No. 2, May 22, 2018.

* cited by examiner

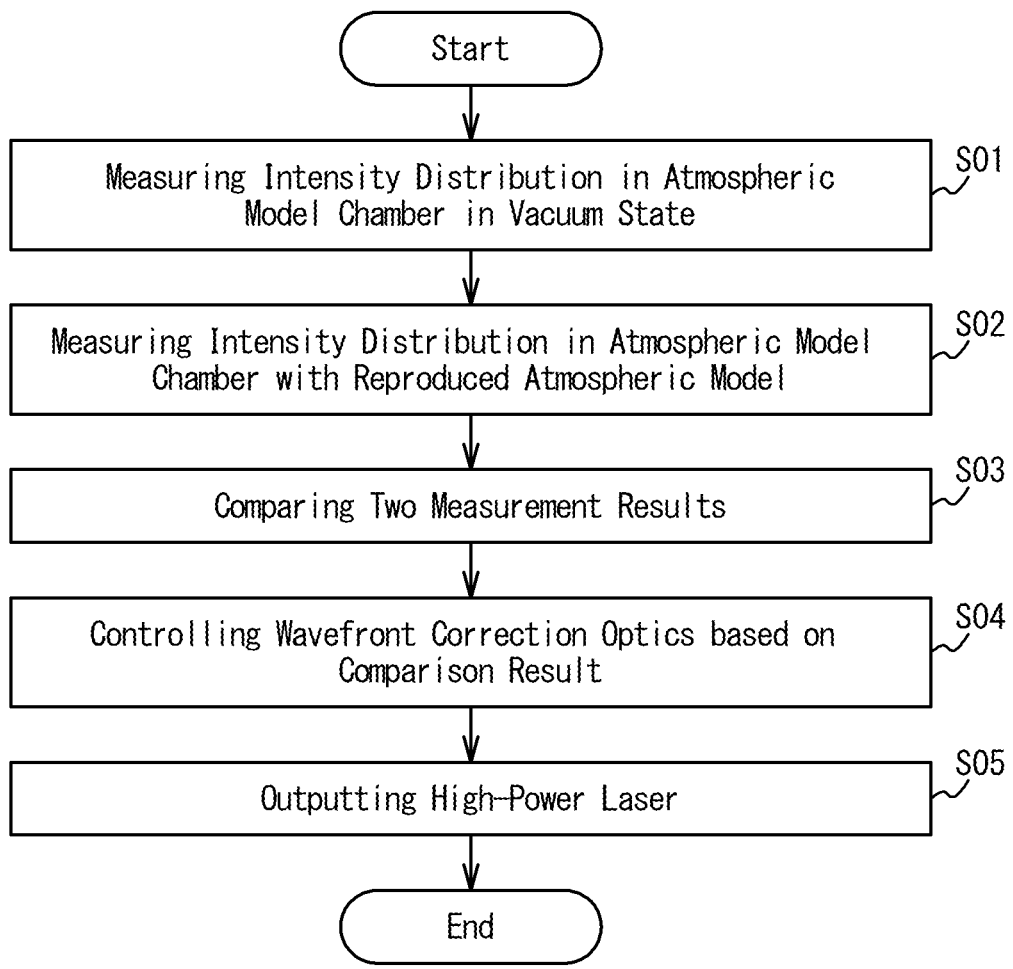

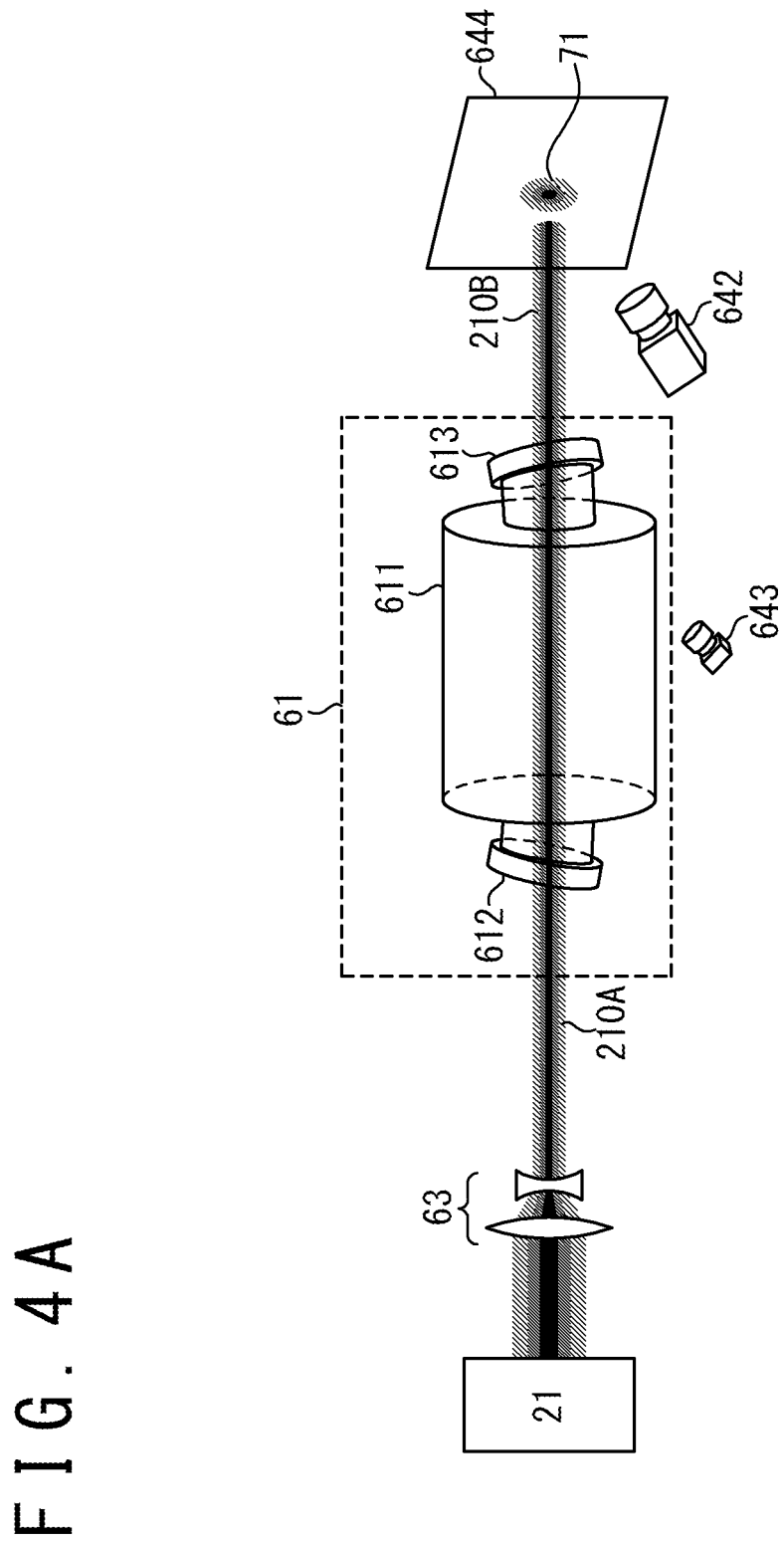

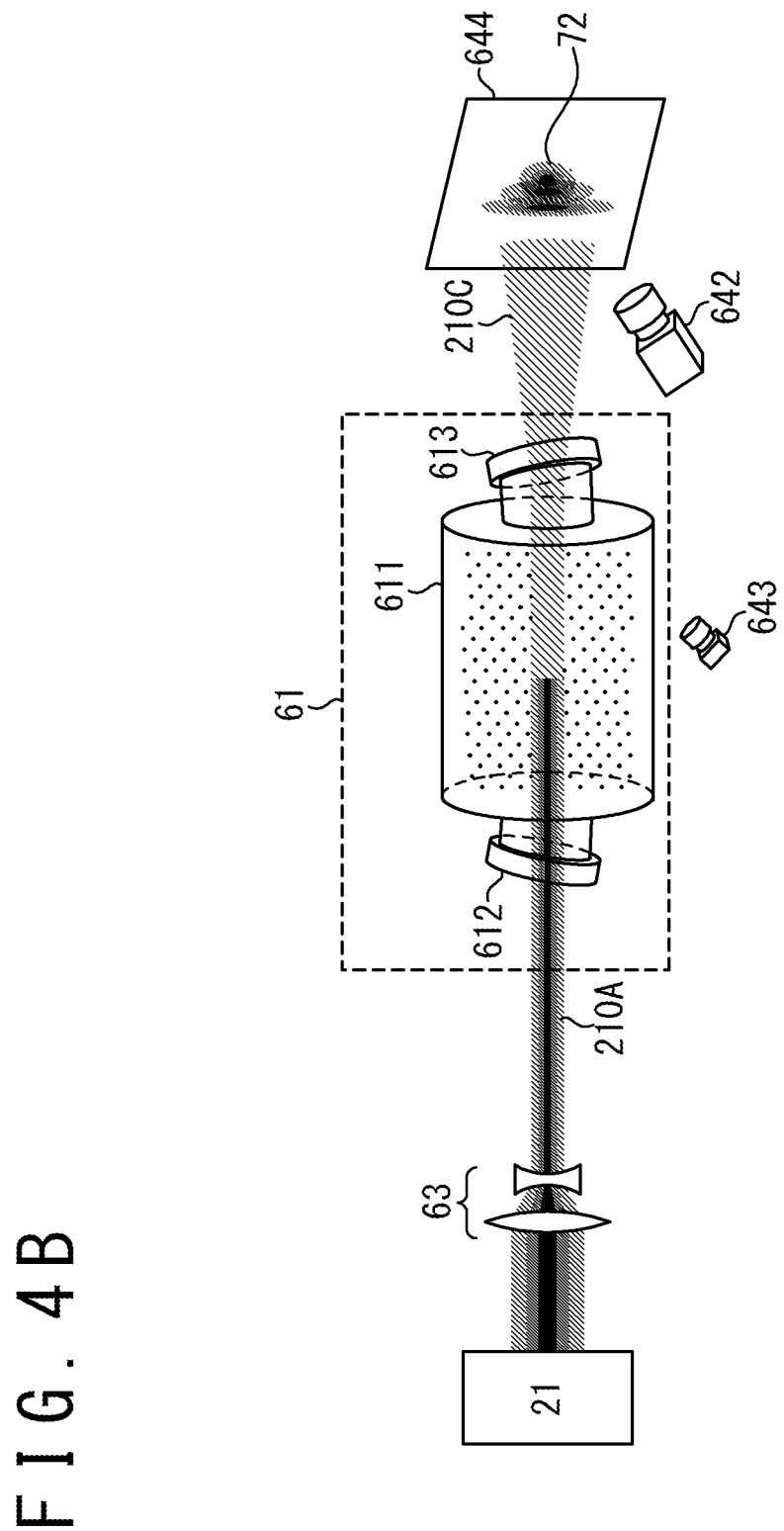

OPTICAL SYSTEM AND OPTICAL COMPENSATION METHOD

TECHNICAL FIELD

The present invention relates to an optical system and an optical compensation method.

BACKGROUND ART

A thermal blooming effect may occur when high-power laser light propagates in atmosphere. The thermal blooming effect is a phenomenon in that an energy of light that propagates in a medium is absorbed by the medium itself so that this medium is heated and characteristics of light transmission path change. The thermal blooming effect hinders practical application of long-distance propagation of high-power laser light represented by energy transmission.

In relation to the above, Patent Literature 1 (Japanese Patent Publication No. 2005-101223) discloses an invention related to a high-power laser amplifier. This high-power laser amplifier is provided with a solid-state laser medium, a housing and an excitation source. The solid-state laser medium amplifies laser light. The housing houses the solid-state laser medium. The excitation source excites the solid-state laser medium with excitation light. This high-power laser amplifier is provided with a phase-conjugated mirror that compensates for wavefront disturbance in the laser optical path and is characterized in that a cooling medium of the solid-state laser medium is a liquid.

The high-power laser amplifier disclosed in Patent Literature 1 cancels wavefront disturbance by inverting a wavefront of laser light that is disturbed by change of characteristics of a transmission path by use of phase conjugated mirror and by making it pass through the transmission path again. This high-power laser amplifier can correct wavefront disturbance that occurs inside a laser system but cannot correct wavefront disturbance of laser light that propagates in an external atmosphere.

In addition, Non-Patent Literature 1 (Jonathan F. Schonfeld, "The Theory of Compensated Laser Propagation through Strong Thermal Blooming", THE LINCOLN LABORATORY JOURNAL, Volume 5, Number 1, pp. 131-150, 1992) discloses that a correction against a thermal blooming effect cannot be focused in a closed loop.

For example, when atmosphere is heated due to propagation of light, the atmosphere expands, its refractive index decreases and the light that passes through such a region is diffused. When performing a control so as to focus in a region where light is diffused, the light is focused in a heated region and heating in this region proceeds further. As a result, the control system diverges.

In addition, Patent Literature 2 (B. Hafizi, "Determination of absorption coefficient based on laser beam thermal blooming in gas-filled tube", Applied Optics, Vol. 53, Issue 22, pp. 5016-5023, 2014) discloses that absorption characteristics of a gas in a tube can be obtained from a thermal blooming effect occurred by passing laser inside the tube with a diameter of 4 cm and a length of 5.5 m.

CITED LIST

Patent Literature

[Patent Literature 1] Japanese Patent Publication No. 2005-101223

Non-Patent Literature

[Non-Patent Literature 1] Jonathan F. Schonfeld, "The Theory of Compensated Laser Propagation through Strong Thermal Blooming", THE LINCOLN LABORATORY JOURNAL, Volume 5, Number 1, pp. 131-150, 1992

[Non-Patent Literature 2] B. Hafizi, "Determination of absorption coefficient based on laser beam thermal blooming in gas-filled tube", Applied Optics, Vol. 53, Issue 22, pp. 5016-5023, 2014

SUMMARY

An optical system that obtains characteristics of a transmission path in atmosphere, when laser light propagates through this transmission path, at a place separated from this transmission path and before the propagation, and corrects wavefront of the laser light based on the obtained characteristics, is provided. Other problems to be solved and novel features will become apparent from disclosures of the present description and attached drawings.

According to an embodiment, an optical system is provided with an irradiation device and an atmospheric characteristics obtaining system. The irradiation device irradiates an external target with light via a first optical path. The atmospheric characteristics obtaining system is arranged in a second optical path separated from the first optical path and obtains characteristics of atmospheric environment in the first optical path with respect to the irradiated light. The irradiation device is provided with wavefront correction optics. The wavefront correction optics correct wavefront of the irradiated light based on the obtained characteristics.

According to an embodiment, an optical correction method includes obtaining characteristics of an atmospheric environment in a first optical path through that light irradiated to an external target passes, with respect to this light, in a second optical path separated from the first optical path, controlling wavefront correction optics so as to correct a wavefront of the light based on the obtained characteristics, and irradiating the target with light via the wavefront correction optics and the first optical path.

According to the above-described embodiment, when laser light propagates through a transmission path in atmosphere, a wavefront of the laser light can be optically corrected based on characteristics of atmospheric environment in this transmission path.

BRIEF DESCRIPTION OF DRAWINGS

FIG. 3 is a flowchart that shows a configuration example of an irradiation method according to an embodiment.

FIG. 4A is a diagram that shows a state example of atmospheric characteristics obtaining laser light according to an embodiment.

FIG. 4B is a diagram that shows a state example of atmospheric characteristics obtaining laser light according to an embodiment.

DETAILED DESCRIPTION

Embodiments of an optical system according to the present invention will be described below with reference to attached drawings.

First Embodiment

Figure 1:
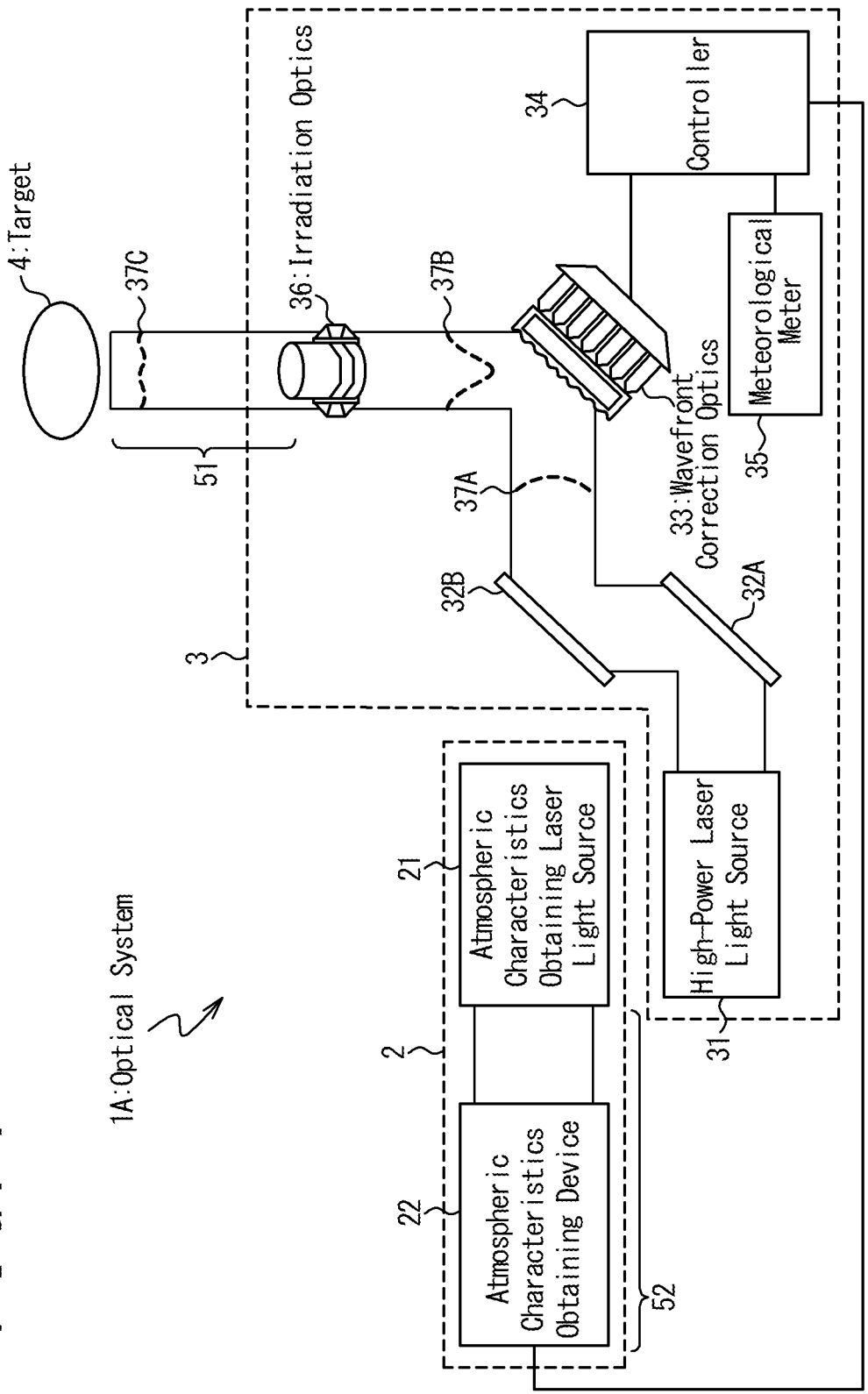
FIG. 1 is a diagram that shows a configuration example of an optical system according to an embodiment.

FIG. 1 is a diagram that shows a configuration example of an optical system 1A according to an embodiment. The optical system 1A is provided with an atmospheric characteristics obtaining system 2 and an irradiation device 3.

The irradiation device 3 is configured to irradiate an external target 4 with light. The atmospheric characteristics obtaining system 2 is configured to obtain characteristics of an atmosphere of a first optical path 51 through that the light passes, at a second optical path 52 that is separated from the first optical path 51, before the light is irradiated. The first optical path 51 includes at least a part of an optical path in that the light irradiated from the irradiation device 3 reaches the target 4.

The irradiation device 3 is provided with a high-power laser light source 31, mirrors 32A and 32B, wavefront correction optics 33, a controller 34, a meteorological meter 35 and irradiation optics 36. In the following, the mirrors 32A and 32B may not be distinguished and be collectively referred to as mirrors 32.

The high-power laser light source 31 generates high-power laser light so as to reach the target 4. The mirrors 32 are arranged so as to guide the generated high-power laser light to the wavefront correction optics 33. The wavefront correction optics 33 are configured to correct, when reflecting the high-power laser light to the irradiation optics 36, wavefront of the high-power laser light under control of the controller 34. According to an embodiment, the wavefront correction optics 33 are a deformable mirror. The controller 34 is configured to control the wavefront correction optics 33 based on the characteristics of the atmospheric environment that are obtained by the atmospheric characteristics obtaining system 2 and the meteorologic information that is obtained by the meteorological meter 35. The meteorological meter 35 is configured to obtain meteorologic information in the first optical path 51, the second optical path 52 or vicinities thereof to transmit to the controller 34. The irradiation optics 36 is arranged in the first optical path 51 and is configured to guide the high-power laser light reflected by the wavefront correction optics 33 to the target 4.

The atmospheric characteristics obtaining system 2 is provided with an atmospheric characteristics obtaining laser light source 21 and an atmospheric characteristics obtaining device 22.

The atmospheric characteristics obtaining laser light source 21 is configured to generate atmospheric characteristics obtaining laser light 210.

Figure 2:
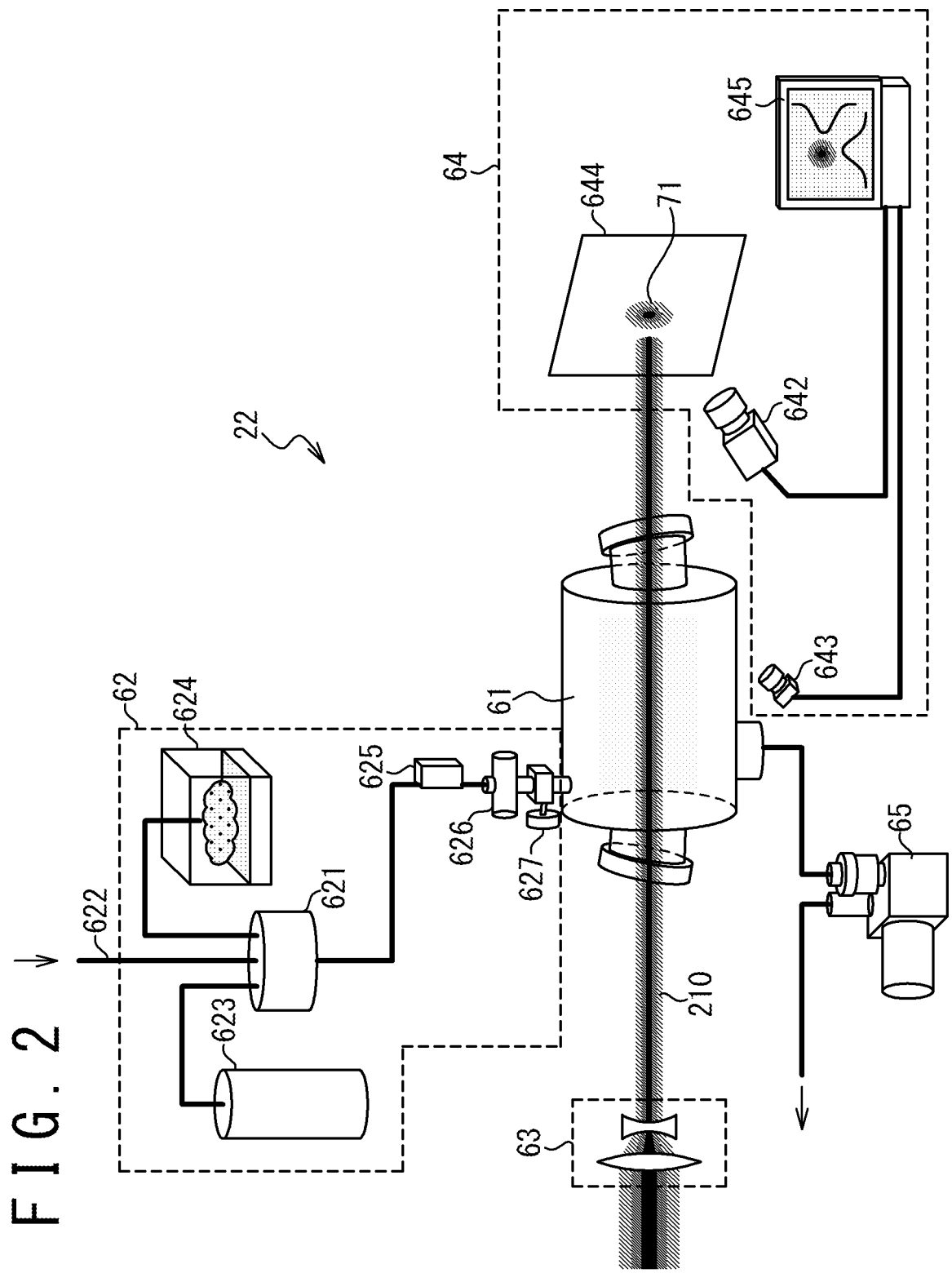
FIG. 2 is a diagram that shows a configuration example of an atmospheric characteristic obtaining device according to an embodiment.

FIG. 2 is a diagram that shows a configuration example of the atmospheric characteristics obtaining device 22 according to an embodiments. The atmospheric characteristics obtaining device 22 is provided with an atmospheric model chamber 61, an atmospheric environment reproducing device 62, a beam diameter adjustment mechanism 63, a measurement device 64 and a vacuum pump 65.

The atmospheric model chamber 61 is a container with airtightness configured so that the atmosphere characteristics obtaining laser light 210 can be incident thereto, pass therethrough and be emitted therefrom. The atmospheric environment reproducing device 62 is connected to the atmospheric model chamber 61 and is configured to be able to reproduce therein the atmospheric environment of the first optical path 51 at the second optical path 52 separated from the first optical path 51. The beam diameter adjustment mechanism 63 adjusts an intensity distribution of the atmospheric characteristics obtaining laser light 210 by adjusting a beam diameter of the atmospheric characteristics obtaining laser light 210. The measurement device 64 is configured to be able to measure the characteristics of the atmosphere environment in the second optical path 52 by use of light that passes through the atmospheric model chamber 61. The vacuum pump 65 is connected to the atmospheric model chamber 61 and is configured to be able to make the inside of the atmospheric model chamber 61 evacuated.

The atmospheric environment reproducing device 62 is provided with a gas mixer 621, an atmosphere intake port 622, a standard atmosphere container 623, an aerosol generator 624, a gas flowmeter 625, a particle counter 626 and a gas flow rate control valve 627.

The gas mixer 621 is configured to mix gases and/or aerosols and the like that are supplied from the atmosphere intake port 622, the standard atmosphere container 623 and the aerosol generator 624 to provide the atmosphere model chamber 61 therewith. The atmosphere intake port 622 is configured to take surrounding atmosphere in to be able to provide the gas mixer 621 therewith. The atmosphere intake port 622 may be arranged to take atmosphere in from the first optical path 51, in particular. The atmosphere taken in from the first optical path 51 will be referred to as optical path atmosphere. The standard atmosphere container 623 is a container filled with standard atmosphere and is configured to be able to provide the gas mixer 621 with this standard atmosphere. It should be noted that the standard atmosphere is a gas configured to have composition, temperature, density and the like based on a given standard. The aerosol generator 624 is a device that generates aerosols that are made by providing and mixing solid-state particles, liquid-state particles and/or various particles having similar characteristics that cause optical scattering phenomenon, and is configured to be able to provide the gas mixer 621 with the generated aerosols. The gas flowmeter 625 is arranged between the gas mixer 621 and the atmospheric model chamber 61 and measures a quantity of gas that flows from the gas mixer 621 to the atmosphere model chamber 61. The particle counter 626 is arranged between the gas mixer 621 and the atmospheric model chamber 61 and counts a number of particles of the aerosols included in the gas that flows from the gas mixer 621 to the atmospheric model chamber 61. The gas flow rate control valve 627 is arranged between the gas mixer 621 and the atmospheric model chamber 61 and is configured to be able to control a flow rate of the gas that flows from the gas mixer 621 to the atmospheric model chamber 61, stop the flow of the gas, and the like. According to an embodiment, the gas mixer 621, the gas flowmeter 625, the particle counter 626, the gas flow rate control valve 627 and the atmospheric model chamber 61 are connected so that the gas that flows from the gas mixer 621 to the atmospheric model chamber 61 passes therethrough in this order.

The measurement device 64 is provided with an intensity distribution observation camera 642, a scattered light observation camera 643, a screen 644 and a monitor device 645.

The screen 644 is configured to be able to visualize an intensity distribution of the atmospheric characteristics obtaining laser light 210 by being irradiated with the atmospheric characteristics obtaining laser light 210 that has passed through the atmospheric model chamber 61 to be generated with a beam spot 71. The intensity distribution observation camera 642 is configured to be able to obtain an intensity distribution of the atmospheric characteristics obtaining laser light 210 by observing the beam spot 71 generated on the screen 644. The scattered light observation camera 643 is configured to be able to obtain, by observing inside the atmospheric model chamber 61, an intensity of scattered light that is the atmospheric characteristics obtaining laser light 210 scattered in a vacuum state or in a state in that a given atmospheric model is reproduced. The monitor device 645 is configured to be able to receive results observed by the intensity distribution observation camera 642 and the scattered light observing camera 643 or various information obtained by the intensity distribution observation camera 642 and the scattered light observing camera 643, to display to outside.

An operation example of the optical system 1A according to an embodiment, that is, an optical correction method according to an embodiment will be described.

FIG. 3 is a flowchart that shows a configuration example of an irradiation method according to an embodiment. The flowchart in FIG. 3 includes a total of five steps, from the first step S01 to the fifth step S05. When the flowchart in FIG. 3 starts, the first step S01 is executed.

In the first step S01, the optical system 1A measures, by use of an atmospheric model chamber 61 in a vacuum state, an intensity distribution of atmospheric characteristics obtaining laser light 210 that has passed through the atmospheric model chamber 61.

At first, a vacuum state is generated inside the atmospheric model chamber 61 by use of the vacuum pump 65. This vacuum state means that an atmospheric pressure is less than or equal to 10 kilopascal, for example.

FIG. 4A is a diagram that shows a state example of atmospheric characteristics obtaining laser light 210 according to an embodiment. The atmospheric model chamber 61 is provided with a body 611, a first window 612 and a second window 613. The body 611 is airtight and isolates the internal space of the atmospheric model chamber 61 from outside. The body 611 is durable against vacuum.

The first window 612 is configured so that atmospheric characteristics obtaining laser light 210 can be incident therethrough from outside to inside of the body 611. The second window 613 is configured so that the atmospheric characteristics obtaining laser light 210 can be emitted therethrough from the inside to the outside of the body 611. The first window 612 and the second window 613 are arranged so that the atmospheric characteristics obtaining laser light 210 that is incident through the first window 612 can pass through the inside of the body 611 along the second optical path 52 and can be emitted from the second window 613. It should be noted that it is preferable that the first window 612 and the second window 613 have appropriate angles to the optical axis so that, even if the atmospheric characteristics obtaining laser light 210 is reflected by the first window 612 and/or the second windows 613, the reflected light does not return to the atmospheric characteristics obtaining laser light source 21. In addition, the first window 612 and the second window 613 may be configured similarly and may be able to exchange their roles to each other.

Next, the atmospheric characteristics obtaining laser light source 21 generates the atmospheric characteristics obtaining laser light 210. The beam diameter of the atmospheric characteristics obtaining laser light 210 is adjusted by passing through the beam diameter adjustment mechanism 63. In other words, an intensity distribution of the atmospheric characteristics obtaining laser light 210 is adjusted by passing through the beam diameter adjustment mechanism 63. The atmospheric characteristics obtaining laser light 210 that has passed through the beam diameter adjustment mechanism 63 is incident inside the atmospheric model chamber 61 via the first window 612. The atmospheric characteristics obtaining laser light 210 that is incident via the first window 612 passes through the inside of the atmospheric model chamber 61 in a vacuum state, is emitted outside via the second window 613 and irradiates the screen 644.

The atmospheric characteristics obtaining laser light 210 before incidence via the first window 612 will be referred to as pre-incidence laser light 210A, for distinction. In addition, the atmospheric characteristics obtaining laser light 210 after emission via the second window 613 will be referred to as post-emission laser light 210B, for distinction. The pre-incidence laser light 210A and the post-emission laser light 210B will be collectively referred to as atmospheric characteristics obtaining laser light 210.

A beam spot 71 is generated at a part of a surface of the screen 644 irradiated by the post-emission laser light 210B. The intensity distribution observation camera 642 measures the intensity distribution of the post-emission laser light 210B by observing the beam spot 71. The intensity distribution observation camera 642 may store observation results to a storage device that is not illustrated or may transmit the observation results to the controller 34.

The scattered light observing camera 643 observes how the atmospheric characteristics obtaining laser light 210 is scattered inside the atmospheric model chamber 61. The scattered light observing camera 643 may store observation results to a storage device that is not illustrated or may transmit the observation results to the controller 34. The second step S02 is executed after the first step S01.

In the second step S02, the optical system 1A uses the atmospheric model chamber 61 in a state in that an atmospheric environment in the first optical path 51 is reproduced inside, to measure the intensity distribution of the atmospheric characteristics obtaining laser light 210 that has passed through this atmospheric model chamber 61.

At first, the atmospheric environment of the first optical path 51 is reproduced inside the atmospheric model chamber 61 by use of the atmospheric environment reproducing device 62. According to an embodiment, the optical path atmosphere is supplied inside the atmospheric model chamber 61 via the atmosphere intake port 622 and the gas flow rate control valve 627. Herein, if the inside of the atmospheric model chamber 61 is kept in the vacuum state of the previous first step S01, the atmosphere around the first optical path 51 flows inside the atmospheric model chamber 61 by simply opening the gas flow rate control valve 627. It should be noted that the gas flowmeter 625 and the particle counter 626 may be arranged between the atmosphere intake port 622 and the gas flow rate control valve 627. The gas mixer 621 may be further arranged between the atmosphere intake port 622 and the gas flow rate control valve 627. According to an embodiment, the optical path atmosphere taken in via the atmosphere intake port 622 may be mixed with the standard atmosphere stored in the standard atmosphere container 623, various particles generated by the aerosol generator 624 and the like in the gas mixer 621, and a mixed gas generated by this mixing may be flowed inside the atmospheric model chamber 61. In other words, the mixed gas can be obtained by mixing the standard atmosphere, particles and the like to the atmosphere around the first optical path 51, in order to reproduce the atmospheric environment of the first optical path 51 inside the atmospheric model chamber 61 arranged at the second optical path 52 with higher accuracy. According to an embodiment, the mixed gas to be supplied to the atmospheric model chamber 61 may be generated by simply mixing the standard atmosphere and various particles, without using the atmosphere intake port 622. In the following, the atmosphere around the first optical path 51 and/or the mixed gas existing inside the atmospheric model chamber 61 will be collectively referred to as atmospheric environment reproduction gas.

Next, similarly to the first step S01, the atmospheric characteristics obtaining laser light 210, that is generated by the atmospheric characteristics obtaining laser light source 21, and of which the beam diameter and the intensity distribution are adjusted by the beam diameter adjustment mechanism 63, is incident inside the atmospheric model chamber 61 via the first window 612. The atmospheric characteristics obtaining laser light 210 that is incident via the first windows 612 passes through the atmospheric environment reproduction gas existing inside the atmospheric model chamber 61, is emitted via the second window 613 and irradiates the screen 644. Herein, the atmospheric characteristics obtaining laser light 210 after emission from the second window 613 will be referred to as post-emission laser light 210C, for distinction. It should be noted that the atmospheric characteristics obtaining laser light 210 before incidence from the first window 612 will be referred to as pre-incidence laser light 210A, similarly to the case of the first step S01. In other words, the pre-incidence laser light 210A and the post-emission laser light 210C will be collectively referred to as atmospheric characteristics obtaining laser light 210.

FIG. 4B is a diagram that shows a state example of atmospheric characteristics obtaining laser light 210 according to an embodiment. A beam spot 72 appears at a part of the surface of the screen 644 irradiated by the post-emission laser light 210C. FIG. 4B shows an example of a case in that a shape of the beam spot 72 is disturbed, compared to the beam spot 71 shown in FIG. 4A, by a thermal blooming effect due to the atmospheric environment reproduction gas or the like. The intensity distribution observation camera 642 measures the intensity distribution of the post-emission laser light 210C by observing the beam spot 72. The intensity distribution observation camera 642 may store observation results to a storage device that is not illustrated or may transmit the observation results to the controller 34.

The scattered light observing camera 643 observes how the atmospheric characteristics obtaining laser light 210 is scattered by the atmospheric environment reproduction gas inside the atmospheric model chamber 61. The scattered light observing camera 643 may store observation results to a storage device that is not illustrated or may transmit the observation results to the controller 34. The third step S03 will be executed after the second step S02.

In the third step S03, two measurement results obtained at the first step S01 and the second step S02 are compared. That is, on one hand, intensity distributions of the post-emission laser lights 210B and 210C, that are measurement results of the intensity distribution observation camera 642, are compared. In addition, on the other hand, the scatterings of the atmospheric characteristics obtaining laser lights 210, that are measurement results of the scattered light observing camera 643, are compared. Those comparisons may be performed by a storage device and a processor that are not illustrated or may be performed by the controller 34.

By performing those comparisons, influences of the atmospheric environment reproduction gas to laser light can be calculated by excluding influences due to the atmospheric characteristics obtaining system 2 including the atmospheric model chamber 61. In other words, by comparing the measurement results of the vacuum state and the state in that the atmospheric environment is reproduced, only influence of thermal blooming effect due to the atmospheric environment reproduction gas can be extracted.

In addition, it is also relatively easy to calculate an influence of the atmospheric environment in the first optical path 51 to high-power laser light based on an influence of the atmospheric model chamber 61 arranged in the second optical path 52 to atmospheric characteristics obtaining laser light 210. Those calculations can be performed based on known information such as a difference of lengths of the first optical path 51 and the second optical path 52, and a difference of intensity and intensity distribution between the atmospheric characteristics obtaining laser light 210 and the high-power laser light. The results calculated as above are stored to the controller 34. The fourth step S04 is executed after the third step S03.

In the fourth step S04, the controller 34 controls the wavefront correction optics 33 based on results of comparisons in the third step S03. In other words, the controller 34 controls the wavefront correction optics 33 so that the wavefront of a high-power laser light approaches an ideal state when the high-power laser light reaches the target 4 by being reflected by the wavefront correction optics 33, passing through the irradiation optics 36 and propagating the first optical path 51. In further other words, the controller 34 controls the wavefront correction optics 33 so as to cancel thermal blooming effect occurred by propagation of high-power laser light in atmosphere existing in the first optical path 51.

According to an embodiment, the controller 34 controls the wavefront correction optics 33 by use of Zernike approximation polynomial. In other words, the controller 34 controls the wavefront correction optics 33 after converting the calculation results obtained in the third step S03 into a format that can be handled as Zernike approximation polynomial.

The controller 34 may control the wavefront correction optics 33 further based on meteorologic information obtained by the meteorological meter 35, in addition to the comparison results of the third step S03. The meteorologic information used for control of the wavefront correction optics 33 may include, for example, a part or all of air temperature, humidity, air pressure, wind speed and the like. The fifth step S05 will be executed after the fourth step S04.

In the fifth step S05, the high-power laser light source 31 outputs high-power laser light. At first, the outputted high-power laser light travels to the wavefront correction optics 33 via the mirror 32. According to an embodiment shown in FIG. 1, the wavefront of the high-power laser light just before being reflected by the wavefront correction optics 33 is shown as wavefront 37A. A shape of the wavefront 37A is known since it is determined by characteristics of the high-power laser light source 31 and the mirror 32.

Next, the high-power laser light is reflected by the wavefront correction optics 33. At that time, the wavefront correction optics 33 is controlled beforehand in the fourth step S04 by the controller 34. Therefore, it is predicted that the wavefront 37B of the high-power laser light immediately after the reflection at the wavefront correction optics 33 is changed from the wavefront 37A immediately before the reflection.

Next, the high-power laser light travels to the target 4 via the irradiation optics 36 and the first optical path 51. The shape of the wavefront of the high-power laser light changes, during a propagation in the first optical path 51, due to thermal blooming effect of the atmosphere existing in this first optical path 51. The wavefront correction optics 33 is controlled by the controller 34 so that the wavefront 37C of the high-power laser light immediately before reaching the target 4 has an ideal shape, as a result of this change, from a viewpoint of energy transmission to the target 4. The ideal shape of the wavefront 37C may be, for example, a shape that is focused to one point on the surface of the target 4 and may have a spherical surface having this focus point at a center thereof. Or, for example, the ideal shape of the wavefront 37C may be a shape that is irradiated on a plane that is a part of the surface of the target 4 and may have a planar shape parallel to this partial plane.

When the fifth step S05 is ended, the flowchart in FIG. 3 ends. It should be noted that the first step S01 to the fifth step S05 may be repeated after the fifth step S05. However, if it is considered that there is no change in measurement results obtained in the first step S01, the second step S02 to the fifth step S05 may be repeated after the fifth step S05. In such a case also, it is preferable to discharge the atmospheric environment reproduction gas, that exists inside the atmospheric model chamber 61, to outside by use of the vacuum pump 65, before starting the second step S02.

The high-power laser light may be outputted in pulse form or may be outputted continuously. In other words, the fifth step S05 may be executed a plurality of times or may be executed at once during a long time. In any case, it is considered that the atmospheric environment in the first optical path 51 fluctuates with time. Thus, the first step S01 to the fourth step S04 may be repeatedly executed in a frequency unrelated to frequency, length of time or the like of executing the fifth step S05. By doing so, the wavefront correction optics 33 can be continuously controlled in accordance with fluctuation of thermal blooming effect due to fluctuation of atmospheric environment.

Second Embodiment

Figure 5:
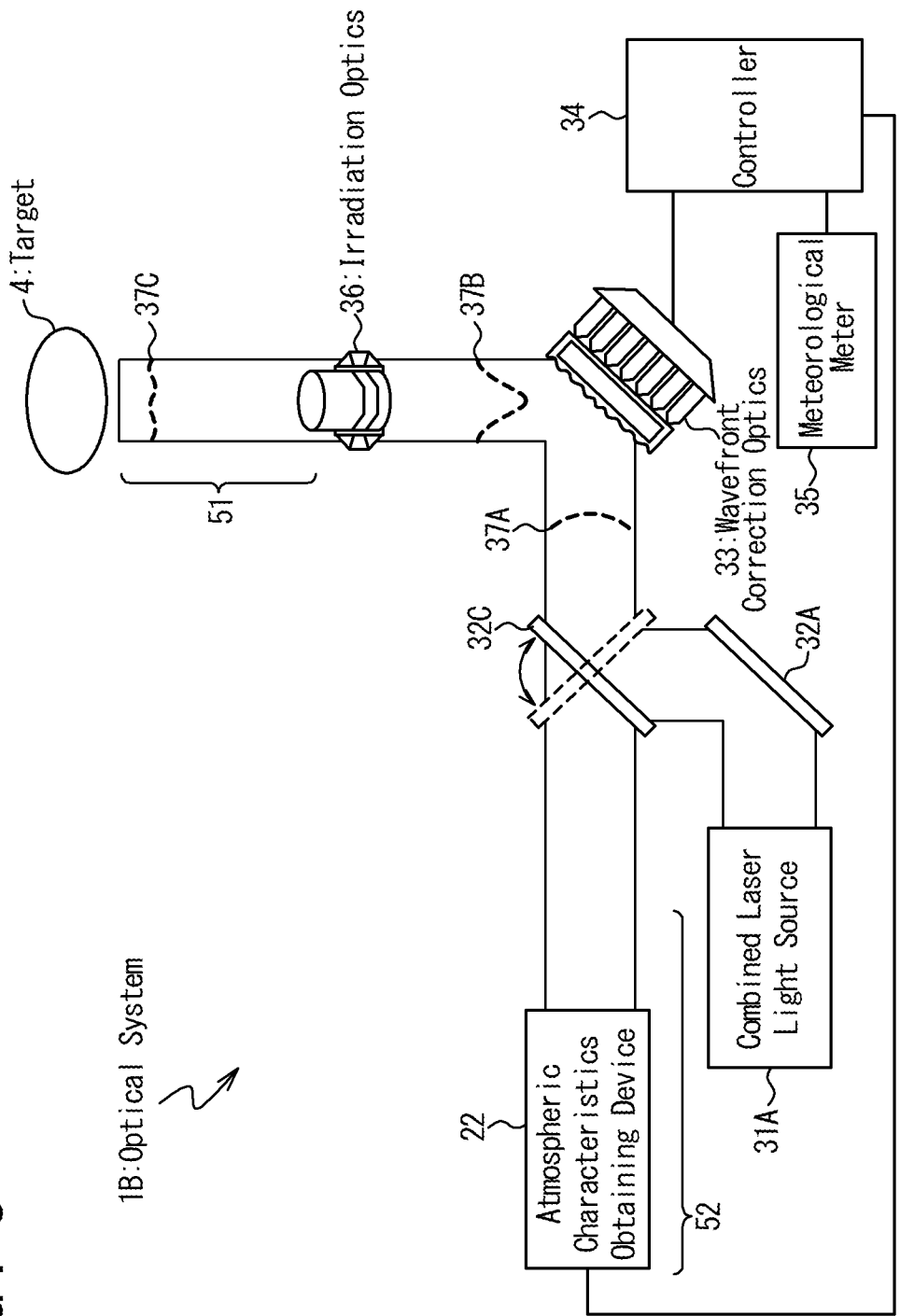
FIG. 5 is a diagram that shows a configuration example of an optical system according to an embodiment.

FIG. 5 is a diagram that shows a configuration example of an optical system 1B according to an embodiment. The optical system 1B shown in FIG. 5 is different in following points, compared to the optical system 1A shown in FIG. 1.

As a first point of difference, the optical system 1B in FIG. 5 is provided with a combined laser light source 31A instead of the atmospheric characteristics obtaining laser light source 21 and the high-power laser light source 31 with which the optical system 1A in FIG. 1 is provided. The combined laser light source 31A is configured to be able to switch an operation as the atmospheric characteristics obtaining laser light source 21 and an operation as the high-power laser light source 31. In other words, the combined laser light source 31A has a function of outputting high-power laser light and a function of outputting atmospheric characteristics obtaining laser light 210, which are switchable. In further other words, the combined laser light source 31A is configured to be able to switch an intensity of outputting laser light. The switching of intensity of laser light that the combined laser light source 31A outputs may be performed under control of the controller 34, may be performed under control of another control system that is not illustrated or may be performed by an operation of a user.

As a second point of difference, the optical system 1B shown in FIG. 5 is provided with a switching mirror 32C instead of the mirror 32B shown in FIG. 1. The switching mirror 32C is configured to be switchable between a first state of reflecting the atmospheric characteristics obtaining laser light 210 outputted by the combined laser light source 31A to the atmospheric characteristics obtaining device 22 and a second state of reflecting the high-power laser light outputted by the combined laser light source 31A to the wavefront correction optics 33. It should be noted that the optical system 1B in FIG. 5 is provided with a switching device that is not illustrated configured to switch the first state and the second state of the switching mirror 32C.

Operations of the optical system 1B according to the present embodiment is different in following points, compared to operations of the optical system 1A shown in FIG. 1.

As a first point of difference, an operation of switching the switching mirror 32C to the first state is performed before starting the first step S01 in the flowchart shown in FIG. 3. In addition, when executing the first step S01, the combined laser light source 31A in FIG. 5 outputs the atmospheric characteristics obtaining laser light 210 instead of the atmospheric characteristics obtaining laser light source 21 in FIG. 1 outputting the atmospheric characteristics obtaining laser light 210.

As a second point of difference, an operation of switching the switching mirror 32C to the second state is performed before starting the second step S02 of the flowchart shown in FIG. 3. In addition, when executing the second step S02, the combined laser light source 31A in FIG. 5 outputs high-power laser light instead of the high-power laser light source 31 in FIG. 1 outputting high-power laser light.

As other configurations and other operations of the present embodiment are similar to the embodiment shown in FIG. 1, further detailed description will be omitted.

In the present embodiment, one laser light source can be omitted, compared to the embodiment shown in FIG. 1, by maintaining same effects.

Third Embodiment

Figure 6:
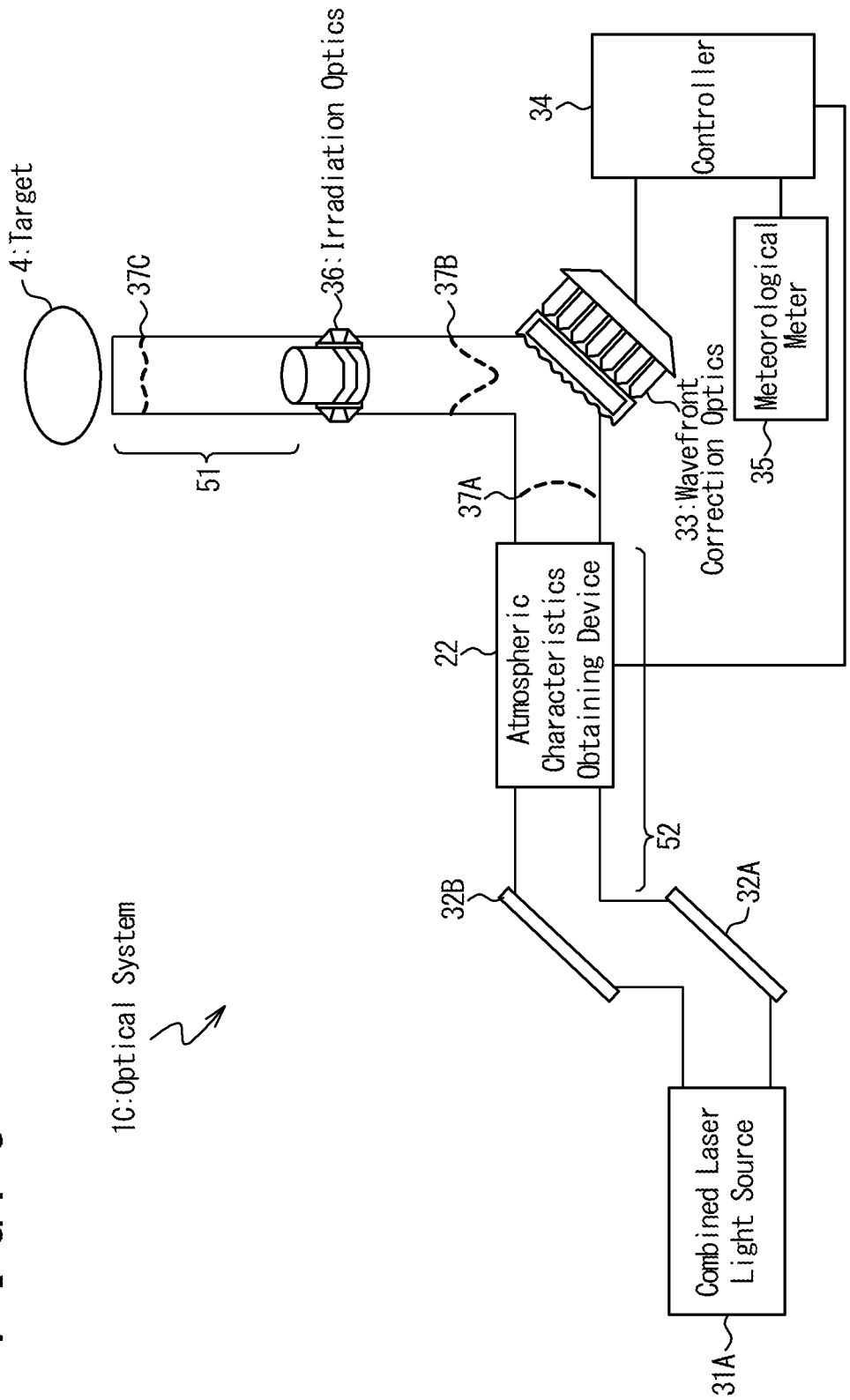
FIG. 6 is a diagram that shows a configuration example of an optical system according to an embodiment.

FIG. 6 is a diagram that shows a configuration example of an optical system 1C according to an embodiment. The optical system 1C shown in FIG. 6 is different in following points, compared to the optical system 1B shown in FIG. 5.

As a first point of difference, the optical system 1C in FIG. 6 is provided with the mirror 32B with which the optical system 1A in FIG. 1 is provided, instead of the switching mirror 32C, at a location same as in FIG. 1.

As a second point of difference, in the optical system 1C in FIG. 6, the atmospheric characteristics obtaining device 22 is arranged between the mirror 32B and the wavefront correction optics 33. It is to be noted that at that time also the second optical path 52 where the atmospheric characteristics obtaining device 22 is arranged is separated from the first optical path 51 existing between the irradiation optics 36 and the target 4.

Operations of the optical system 1C according to the present embodiment is different in the following points, compared to the operations of the optical system 1B shown in FIG. 5.

As a first point of difference, no operation of switching the switching mirror 32C is needed to be performed before starting the first step S01 and the second step S02 of the flowchart in FIG. 3.

As a second point of difference, when executing the fifth step S05 of the flowchart in FIG. 3, the high-power laser light passes through the atmospheric characteristics obtaining device 22. In particular, the high-power laser light passes through the inside of the atmospheric model chamber 61. As the high-power laser light is incident via the first window 612 and is emitted via the second window 613 at that time, the first window 612 and the second window 613 are configured so as to be durable against the high-power laser light.

In addition, it is preferable that the inside of the atmospheric model chamber 61 is vacuum when executing the fifth step S05 so as to minimize influence of the atmospheric model chamber 61 to the high-power laser light. In other words, it is preferable to evacuate the inside of the atmospheric model chamber 61 by use of the vacuum pump 65 before executing the fifth step S05. However, when a length of the atmospheric model chamber 61, that is included in the second optical path 52, in a direction of the second optical path 52 is short so as to be negligeable compared to a length of the first optical path 51 from the irradiation optics 36 to the target 4, the influence of the atmospheric model chamber 61 to the high-power laser light is negligeable. Furthermore, this influence is negligeable based on a fact in that the atmospheric environment of the first optical path 51 is reproduced inside the atmospheric model chamber 61. Therefore, in such a case, the operation of evacuating the inside of the atmospheric model chamber 61 by use of the vacuum pump 65 before executing the fifth step S05 can be omitted.

Furthermore, it can be considered that, when the fifth step S05 is executed, the screen 644 included in the atmospheric characteristics obtaining device 22 blocks propagation of the high-power laser light or is damaged by the high-power laser light on the contrary. Thus, the optical system 1C may be further provided with a non-illustrated mechanism for moving the screen 644 between a set of the first step S01 and the second step S02, and the fifth step S05.

Or, a sampler, that can perform sampling of a part of the atmospheric characteristics obtaining laser light 210, may be provided instead of the screen 644. In this case, in the second step S02, the intensity distribution observation camera 642 measures the intensity distribution of the post-emission laser light 210B by observing light of that the sampler has performed sampling.

As other configurations and other operation of the present embodiment are similar to the embodiment shown in FIG. 5, further detailed descriptions will be omitted.

In the present embodiment, the switching mirror 32C can be omitted, compared to the embodiment shown in FIG. 5, by maintaining same effects.

Although the invention made by the inventor has been described above in detail based on embodiments, it is needless to say that the present invention is not limited to the above-described embodiments and various modifications can be made without departing from the gist thereof. In addition, each of features described in the above embodiments can be freely combined within a technically consistent range.

This application claims priority based on the Japanese Patent Application No. 2018-212842 filed on Nov. 13, 2018 and herein incorporates all disclosure thereof.

The invention claimed is:

1. An optical system comprising:
an irradiation device configured to irradiate an external target with light via a first optical path; and
an atmospheric characteristics obtaining system arranged in a second optical path separated from the first optical path and configured to obtain characteristics of atmospheric environment in the first optical path with respect to the light,
wherein the atmospheric characteristics obtaining system comprises an atmospheric model chamber inside which an atmosphere in the first optical path is reproduced,
wherein the second optical path is defined by the atmospheric model chamber and the atmosphere reproduced inside the atmospheric model chamber,
wherein an internal space of the atmospheric model chamber is isolated from outside, and
wherein the irradiation device comprises:
wavefront correction optics configured to correct wavefront of the light based on the characteristics.

2. The optical system according to claim 1,
wherein the atmospheric characteristics obtaining system further comprises:
a measurement device configured to measure the characteristics by use of light that passes through the atmospheric model chamber.

3. The optical system according to claim 2, further comprising:
a vacuum pump configured to evacuate an inside of the atmospheric model chamber; and
an atmospheric environmental reproducing device configured to make atmospheric environment reproduction gas that reproduces the atmosphere flow in the first optical path into the atmosphere model chamber.

4. The optical system according to claim 3,
wherein the atmospheric environment reproducing device comprises:
an atmosphere intake port configured to take therein optical path atmosphere from the first optical path;
a standard atmosphere container configured to supply standard atmosphere;
an aerosol generator configured to supply aerosols;
a gas mixer configured to mix the optical path atmosphere, the standard atmosphere and the aerosols to generate the atmospheric environment reproduction gas;
a gas flowmeter configured to measure a flow rate of the atmospheric environment reproduction gas that flows from the gas mixer into the atmospheric model chamber;
a particle counter configured to count a number of particles of the aerosols that flows from the gas mixer into the atmospheric model chamber; and
a gas flow rate control valve configured to control the flow rate of the atmospheric environment reproduction gas that flows from the gas mixer into the atmospheric model chamber.

5. The optical system according to claim 4,
wherein the measurement device is further configured to compare a first set of characteristics measured by use of light that passes through the atmospheric model chamber in a first state in which the inside is vacuum and a second set of characteristics measured by use of light that passes through the atmospheric model chamber in a second state in that the inside reproduces the atmospheric environment to obtain the characteristics.

6. The optical system according to claim 5,
wherein the atmospheric model chamber comprises:
- a first window configured to be passed through by incident light that is incident from outside to the inside; and
- a second window configured to be passed through by the incident light that is emitted from the inside to outside, wherein the measurement device comprises:
- a beam diameter adjustment mechanism configured to adjust an intensity distribution of the incident light before an incidence of the light incident through the first window;
- a screen configured to be irradiated with emitted light that is the incident light emitted from the second window to generate a beam spot thereon; and
- an intensity distribution observation camera configured to observe the beam spot to measure an intensity distribution of the emitted light.

7. The optical system according to claim 6, further comprising a controller configured to control the wavefront correction optics so as to cancel an influence to light by a thermal blooming effect in the first optical path based on a result of comparison between a first measurement result based on a first beam spot that is generated by the emitted light emitted from the atmospheric model chamber in the first state and a second measurement result based on a second beam spot generated by the emitted light emitted from the atmospheric model chamber in the second state.

8. The optical system according to claim 7,
wherein the controller is further configured to calculate an influence to light by a thermal blooming effect in the second optical path based on the result of comparison and calculate an influence to light by the thermal blooming effect in the first optical path based on the influence in the second optical path.

9. The optical system according to claim 1, further comprising:
- a first light source configured to generate first light that travels to the target via the wavefront correction optics and the first optical path; and
- a second light source different from the first light source, the second light source configured to generate second light that passes through the inside of the atmospheric characteristics obtaining system so as to obtain the characteristics of the atmospheric environment.

10. The optical system according to claim 1, further comprising:
- a combined light source configured to generate first light that travels to the target via the wavefront correction optics and the first optical path and second light that passes through an inside of the atmospheric characteristics obtaining system so as to obtain the characteristics of the atmospheric environment; and
- a switching mirror configured to switch an optical path of the light generated by the combined light source between the first optical path and the second optical path.

11. The optical system according to claim 1, further comprising:
- a combined light source configured to generate first light that travels to the target via the wavefront correction optics and the first optical path and second light that passes through an inside of the atmospheric characteristics obtaining system so as to obtain the characteristics of the atmospheric environment, wherein the second optical path is arranged so that the first light travels to the target via the second optical path, the wavefront correction optics and the first optical path.

12. The optical system according to claim 1, further comprising a scattered light observing camera configured to observe a scattering of light that passes through the second optical path,
wherein the irradiation device is further configured to control the wavefront correction optics based on a result of observation of the scattering.

13. The optical system according to claim 1, further comprising a meteorological meter configured to obtain weather information in the first optical path,
wherein the irradiation device is further configured to control the wavefront correction optics based on observation result of the meteorological meter.

14. An optical correction method including:
- reproducing, inside an atmosphere model chamber, an atmosphere in a first optical path through which light irradiated to an external target passes;
- obtaining atmospheric characteristics in a second optical path defined by the atmospheric model chamber and the atmosphere reproduced inside the atmospheric model chamber;
- controlling wavefront correction optics so as to correct a wavefront of the light based on the atmospheric characteristics; and
- irradiating the target with light via the wavefront correction optics and the first optical path, wherein the second optical path is separated from the first optical path, and
wherein an internal space of the atmospheric model chamber is isolated from outside.

* * * * *